(12) United States Patent
Zlotnick

(10) Patent No.: US 8,473,526 B2
(45) Date of Patent: Jun. 25, 2013

(54) SYSTEM, METHOD AND COMPUTER PROGRAM PRODUCT FOR MANAGING A GROUP OF COPIES OF A DATA ENTITY

(75) Inventor: Aviad Zlotnick, Mitzpeh Netofa (IL)

(73) Assignee: International Business Machines Corporation, Armonk, NY (US)

( * ) Notice: Subject to any disclaimer, the term of this patent is extended or adjusted under 35 U.S.C. 154(b) by 877 days.

(21) Appl. No.: 11/971,100

(22) Filed: Jan. 8, 2008

(65) Prior Publication Data

US 2009/0177713 A1     Jul. 9, 2009

(51) Int. Cl.
*G06F 17/30*     (2006.01)
*G06F 7/00*     (2006.01)

(52) U.S. Cl.
USPC ........................................................ 707/803

(58) Field of Classification Search
USPC .......................................... 707/205, 101, 802
See application file for complete search history.

(56) References Cited

U.S. PATENT DOCUMENTS

| | | | |
|---|---|---|---|
| 5,819,292 A | 10/1998 | Hitz et al. | |
| 6,138,126 A | 10/2000 | Hitz et al. | |
| 6,289,356 B1 | 9/2001 | Hitz et al. | |
| 6,594,744 B1 | 7/2003 | Humlicek et al. | |
| 6,611,850 B1 * | 8/2003 | Shen | 707/204 |
| 7,120,769 B2 | 10/2006 | Yagawa et al. | |
| 7,529,785 B1 * | 5/2009 | Spertus et al. | 707/203 |
| 2003/0105912 A1 * | 6/2003 | Noren | 711/1 |
| 2007/0038687 A1 * | 2/2007 | Carroll et al. | 707/204 |

\* cited by examiner

*Primary Examiner* — Kuen Lu
(74) *Attorney, Agent, or Firm* — Zilka-Kotab, PC

(57) ABSTRACT

A method for managing a group of targets is provided. The method includes: receiving a request to update a x'th generation copy of a data entity, where x is a positive integer. Then applying an update function responsive to x such as to update a first sub-group of targets. Then receiving a request to read a y'th generation copy of the data entity and (iv) applying a retrieve function responsive to y such as to search for the y'th generation copy of the data entity in a second sub-group of targets. The first and second sub-groups intersect only once and only if y does not exceed x.

20 Claims, 2 Drawing Sheets

SYSTEM, METHOD AND COMPUTER PROGRAM PRODUCT FOR MANAGING A GROUP OF COPIES OF A DATA ENTITY

FIELD OF THE INVENTION

The present invention relates to methods, systems and computer program products for managing a group of copies of a data entity.

BACKGROUND OF THE INVENTION

The importance of data has increased during the last decade while the cost of data storage medium has decreased, thus motivating data storage vendors to provide data protection schemes that are based upon duplication of data.

Point in Time (PiT) copies are used mainly to set aside consistent sets of data for recovery. Many customers require having multiple copies of a single production data entity, usually taken periodically, e.g., every hour.

Typically, different PiT copies are referred to as different generation copies. One of the most prevalent uses of PiT copies is for volumes in storage controllers. To simplify the description, volumes will be used to represent data entities, and tracks will be used to present predefined parts of data entities.

PiT volumes are readable, and writeable. This raises she issue of maintaining the right data for every volume. For example, a write operation on the source volume at time T should be reflected in all the PiT targets that were created after T, but not in those that were created before. A write operation on any target volume should not be reflected in any other target.

There are two extremes for maintaining the data to ensure correctness after write operations. One extreme is to copy data, or references to it to all the targets that have to reflect it. For example, before destaging a track in cache that was modified at a certain point in time t, the version of the track on the disk is destaged to all the PiT volumes that were created before that certain point in time and that do not have their data locally. This policy may become very expensive during Write operations, but results in very fast read operations.

The other extreme would be to store each track only once, and have a cascade of references from each PiT target to the target created right after it. In such a policy write operations would result in at most one track destage, but read operations would require traversing a long chain of references, resulting in a performance penalty.

Taking into account different work loads, it is impossible to say that one policy is better than another. In an environment with very few read operations on the PiT targets, one would probably prefer fast writes even at the price of slow reads. If there are many reads, slower writes are acceptable.

There is a need to provide an efficient method, system, and computer program product for maintaining group of copies of a data entity.

SUMMARY OF THE INVENTION

A method for managing a group of targets is disclosed. The method includes receiving a request to update a x'th generation copy of a data entity; wherein x is a positive integer; applying an update function responsive to x such as to update a first sub-group of targets; receiving a request to read a y'th generation copy of the data entity; and applying a retrieve function responsive to y such as to search for the y'th generation copy of the data entity in a second sub-group of targets. The first and second sub-groups intersect only once and only if y does not exceed x.

The method further includes defining the update function and the retrieve function so as to provide a requested relationship between values of a parameter associated with the applying of the update function and with the applying of the retrieve function.

The method further includes defining a representation format of x and of y such as to determine a relationship between sizes of the first and second sub-groups.

The stage of applying of the update function includes altering a value of a lowest non zero digit of x and wherein the applying of the retrieve function includes altering a value of a lowest non zero digit of y.

BRIEF DESCRIPTION OF THE DRAWINGS

The present invention will be understood and appreciated more fully from the following detailed description taken in conjunction with the drawings in which.

DESCRIPTION OF THE PREFERRED EMBODIMENT

Figure 1:
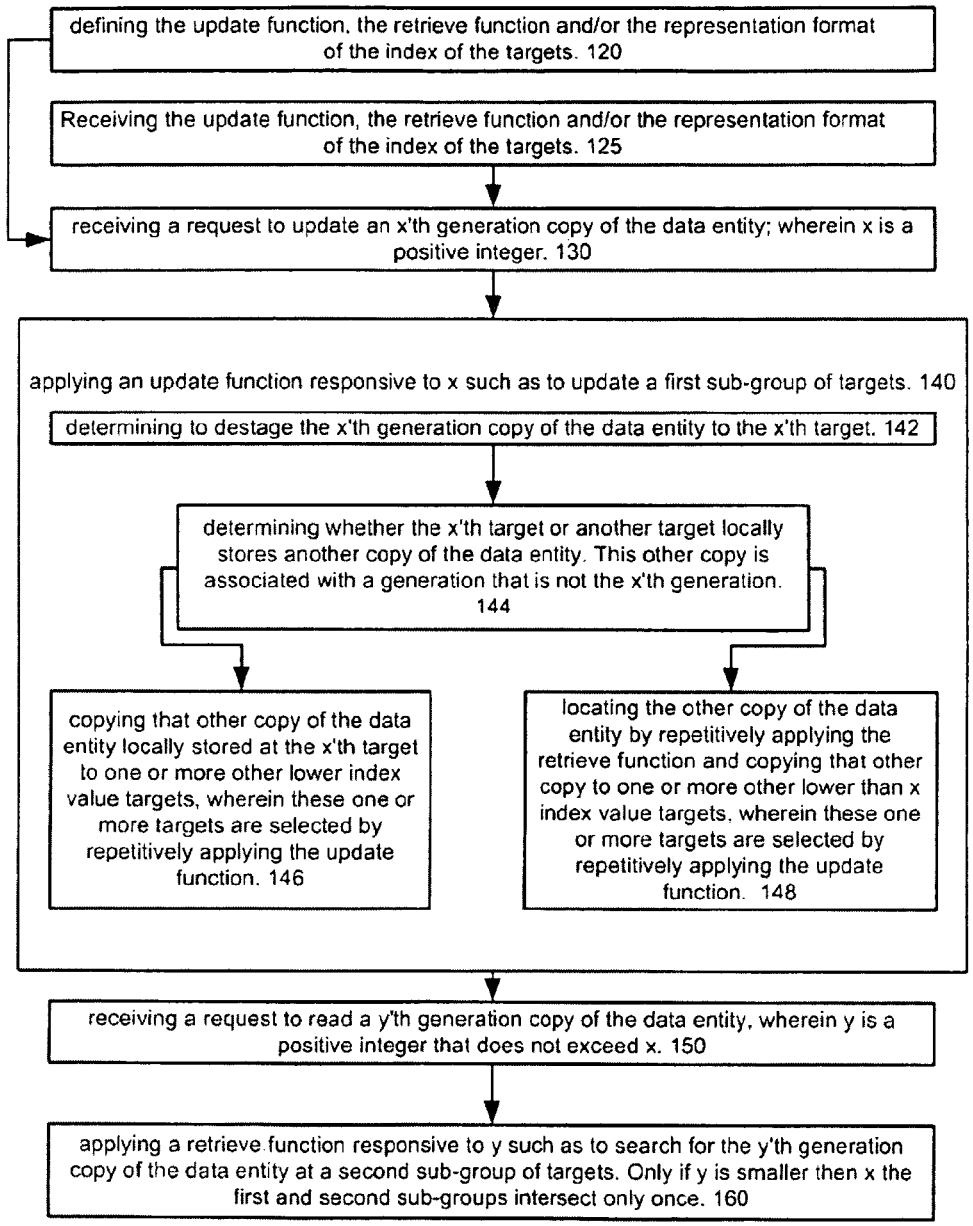
FIG. 1 illustrates a method for managing a group of targets, according to an embodiment of the invention.

Methods, systems and computer program products for managing a group of targets that store different copies of a data entity are provided. These copies can be taken at different points in time, wherein different points in time are referred to as different generations. Conveniently, older generation copies are usually generated before newer generation copies of the data entity.

The managing includes applying an update function and a retrieve function. Both functions operate on multiple numbers that represent different targets and conveniently represent the indexes of the different targets. The update function is used to determine targets that should be affected by a write operation. These targets can form a first sub-group of targets. The retrieve function is used to determine targets that should be affected by a read operation. These targets can form a second sub-group of targets.

Assuming that the targets that are affected by an update operation are denoted U and the copies of the data entity that are affected by a read operation are denoted R, the following properties can be satisfied, for the following positive integers x, y and z:

(i) $x \in R(x)$, $x \in U(X)$;
(ii) if $y \in U(x)$ then $y \geq x$, and $U(y) \subset U(x)$;
(iii) if $y \in R(x)$ then $y \leq x$, and $R(y) \subset R(x)$;
(iv) for any x, $y | U(x) \cap R(y) | = 1$; and
(v) if $x < y < z$ then $(U(x) \cap R(y)) \leq (U(y) \cap R(z))$.

A first sub-group of targets can be defined by repetitively applying an update function. The repetitions can continue while targets having a non-zero index are being added to the first sub-group of targets. The appliance of the update function includes calculating an index of a next target of the first sub-group of targets by subtracting one from a lowest non-zero digit of an index of a current target of the first sub-group of targets. For example, assuming that x is a binary number that equals 1101 then the first target of the first sub-group of targets will include the thirteenth target (index value of 1101), the twelfth target (index value of 1100) and the eighths target (index value of 1000). Yet for another example, if x is decimal number that equals 134 then the first sub-group of targets will include the 134$^{th}$, 133$^{rd}$, 132$^{nd}$, 131$^{st}$, 130$^{th}$, 120$^{th}$, 110$^{th}$ and 100$^{th}$ targets.

A second sub-group of targets can be defined by repetitively applying a retrieve function. The appliance of the retrieve function includes calculating an index of a next target of the second sub-group of targets by: (i) zeroing a lowest non-zero digit of an index of a current target of the second sub-group of targets and (ii) incrementing a digit that follows the zeroed digit. The repetitions can be stopped once a maximal number of targets is exceeded. For example, assuming that y is a binary number that equals 0101 then the first member of the second sub-group of targets will be the fifth target (index value), the second member will be the sixth target (index value of 0110) and the last member is the eighth target (index value of 1000). Yet for another example, if y is decimal number that equals 17 then the second sub-group of members will include the 17$^{th}$, 20$^{th}$, 100$^{th}$ and 1000$^{th}$ targets.

FIG. 1 illustrates method 100 according to an embodiment of the invention.

Method 100 can be executed in a system that includes a source volume and multiple target volumes. The target volumes can reside in one or more storage units while the source volume can be at least partially stored in a cache unit. When method 100 is applied on such a system there is a need to find which track of volume locally stores a portion of a copy of the data entity. This can involve allocating local bit indications (LBIs). In such a system an update operation can include de-staging content, preventing loss of copies of the data entity locally stored at a target that is destined to receive a new copy of the data entity, and the like.

Method 100 starts by stage 120 or by stage 125.

Stage 120 includes defining the update function, the retrieve function and/or the representation format of the index of the targets. The update function and the retrieve function can be defined such as to provide a requested relationship between values of a parameter (such as cost, resource utilization, time of completion) associated with the applying of the update function and with the applying of the retrieve function.

Conveniently, the update function and the retrieve function operate on one or few digits of a number that represents an index of the targets. By altering the format of representation of that index (conveniently changing its radix) the relationship between the numbers of targets that are accessed by applying each of these functions varies. Accordingly, the relationship between the costs of write and read operations is set in a parametric manner.

This parametric setting of values facilitates an alteration of the relative costs of write and read application. This alterations can be responsive to an expected profile of one or more programs (such as applications and the like) to be executed by a storage system that stores multiple copies of the data entity.

It is noted that stage 120 can be executed by a person, in an automatic manner or in a semi-automatic manner. It is further noted that the performance of a storage system that applies the following stages of method 100 can be evaluated and the definition of the functions and/or of the representations of the generation can be altered according to the results.

It is noted that method 100 can include executing read and write operations. For simplicity of explanation FIG. 1 illustrates a write operation that is followed by a read operation. This is not necessarily so.

Stage 125 includes receiving a definition of the update function, of the retrieve function and/or of the representation of the index of the targets.

Stage 120 and stage 125 are followed by stage 130 of receiving a request to update an x'th generation copy of the data entity, wherein x is a positive integer. The format of x can be defined in stage 120 or received in stage 125. Each digit of x can be represented by a different radix, but this is not necessarily so.

Stage 130 is followed by stage 140 of applying an update function responsive to x such as to update a first sub-group of targets. The update function can be executed at least one time.

Conveniently, stage 140 includes stages 142-148.

Stage 142 includes determining to destage the x'th generation copy of the data entity to the x'th target.

Stage 142 is followed by stage 144 of determining whether the x'th target or another target locally stores another copy of the data entity. This other copy is associated with a generation that is not the x'th generation.

If the x'th target stores another copy of the data entity then stage 144 is followed by stage 146 copying that other copy of the data entity to one or more other lower index value targets. The one or more targets are selected by repetitively applying the update function. Conveniently, stage 146 includes updating at least one target by applying the update function in response to a value smaller than x, conveniently (x−1).

If the x'th target does not locally store another copy of the data entity but such copy is located in a higher index value target then stage 144 is followed by stage 148 of locating the other copy of the data entity by repetitively applying the retrieve function. Conveniently, the repetition ends when the first locally stored copy of the data entity is located. The other copy of the data entity is then copied to one or more other lower than x index value targets. The one or more targets are selected by repetitively applying the update function. Stage 140 conveniently ends by de-staging the x'th generation copy of the data entity to the x'th target.

Stage 140 is followed by stage 150 of receiving a request to read a y'th generation copy of the data entity, wherein y is a positive integer that does not exceed x (y≦x).

Stage 150 is followed by stage 160 of applying a retrieve function responsive to y such as to search for the y'th generation copy of the data entity at a second sub-group of targets. It is noted that the first and second sub-groups intersect once. It is further noted that the update function can be executed at least one time.

Conveniently, the update and retrieval functions can be applied on data entities that can be stored in a track, in multiple tracks, in a volume or in multiple volumes.

Conveniently, method 100 further includes withdrawing a target by updating lower index value targets. In many cases the update is relatively slow (especially when large targets are involved). Accordingly, the destaging can involve allowing access (by applying the update and retrieval functions) to the withdrawn copy while updating older generation copies by portions of the withdrawn copy.

Figure 2:
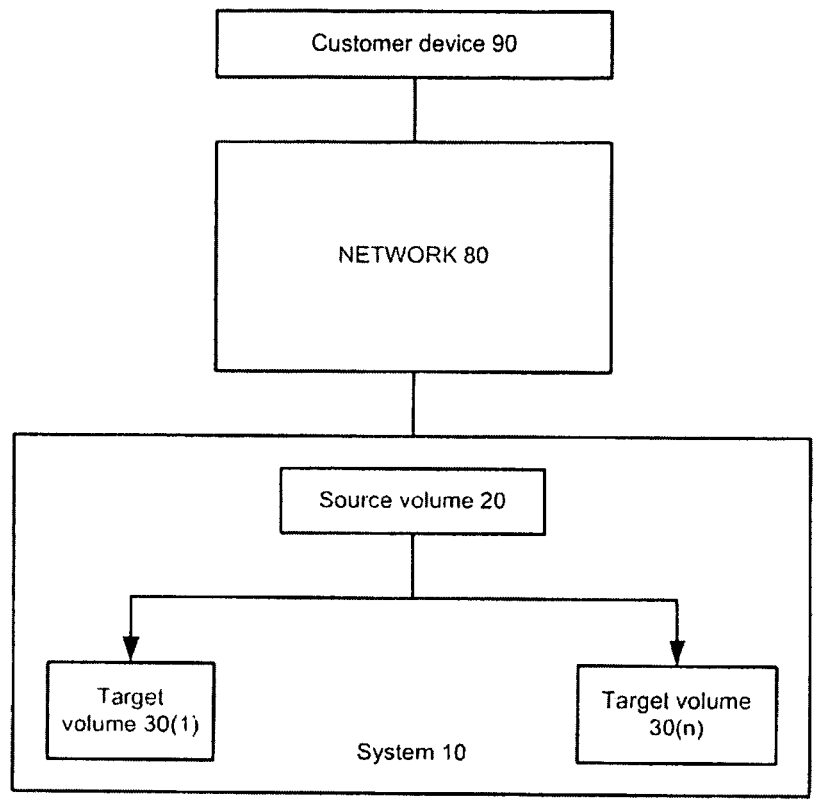
FIG. 2 illustrates a system and its environment, according to an embodiment of the invention.

FIG. 2 illustrates system 10 and its environment, according to an embodiment of the invention.

System 10 includes source volume 20 and multiple targets T(1)-T(n) 30(1)-30(n). Different point in time copies of a data entity stored in source volume can be spread among source volume 20 and targets T(1)-T(n) 30(1)-30(n). De-staging and staging operations are applied when a data entity is sent from source volume 20 to a target volume and vise verse. It is noted that at least a portion of source volume 20 can reside in a cache.

Every track, in every generation, has an LBI that indicates if its data is local or not. A reset LBI means that data is local. Initially, the LBIs of source volume 20 are reset while the LBIs of track volumes 30(1)-30(n) are set. It is noted that a reset operation can zero the value of an LBI while a set operation sets the LBI value to one, but this is not necessarily so.

Whenever there is request to read a track from the i'th generation copy of the source volume, the request is satisfied by returning the track value from the j'th target, wherein the j'th target belongs to a second sub-group of targets that is defined by repetitively applying the retrieve function in response to the value of i, and wherein the j'th target has the smallest index value in the second sub-group of targets for which the data is local. If there is no such target the appropriate value from source volume 20 is returned. Before any writes occur, all tracks are read from source volume 20.

It is noted that the tracks of the source volume have a generation number—the number of the highest PiT generation that existed when the track was written to the source volume 20.

Whenever a i'th generation track is destaged in source volume 20, the value of that track on disk before the destage is written locally in all the targets that do riot store the data locally and that belong to a first sub-group of targets that is defined be repetitively applying the update function in response to value that is smaller than I and can be equal to (i−1). After this update the LBIs of these targets are reset.

A read from the j'th target where j<i, will look for a value in a second sub-group of targets that is defined by repetitively applying the retrieve function in response to the value of j. There is one target that is located in the mentioned above first sub-group and in this second sub-group. Accordingly, this target will provide the requested track. The value of this track is either the value written at the destage operation mentioned above, or a value written previously, i.e., an older value whose generation is $\geq$j. In the latter case it is correct to return the older value.

When a track is destaged in a target T(i), the following operations are performed: (i) Fetching the current value of that track within the j'th target, wherein the j'th target belongs to a second sub-group of targets that is defined by repetitively applying the retrieve function in response to the value of i, and wherein the j'th target has the smallest index value in the second sub-group of targets for which the data is local. (ii) Writing the fetched track locally to a first sub-group of targets that is defined by repetitively applying the update function in response to a value that is smaller than i and can be equal to (i−1). (iii) Performing the destage operation.

Conveniently, any subsequent read from a generation smaller than i, will retrieve the data from a track of the first sub-group previously defined in relation to a value than is smaller than i and can be equal to (i−1). The retrieved value can be an older generation value, if such a value is included in a target that belongs to the first sub-group of targets.

FIG. 2 illustrates system 10 and its environment according to an embodiment of the invention. Conveniently, system 10 is connected by network 80 to a customer device 90. Customer device 90 can be located near system 10, can be remotely located from system 10 and can even be located at a different country, state or continent than system 10. System 10 can provide services to the customer over network 80.

It should be appreciated that request for manipulating data, including but not limited to operations of reading, writing, creating new PiT copies and deleting such copies, can be received and responded to over a network such as network 80 of FIG. 2. The network can be a Storage Area, Network or a Local Area Network but this is not necessarily so.

As will be appreciated by one skilled in the art, aspects of the invention may be embodied as a system, method or computer program product Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a semiconductor or solid-state memory, magnetic tape, a removable computer diskette, a random access memory (RAM), a read-only memory (ROM), a rigid magnetic disk, an erasable programmable read-only memory (EPROM or Flash memory), an optical fiber, a portable compact disc read-only memory (CD-ROM), and an optical disk, or any suitable combination of the foregoing. Current examples of optical disks include compact disk-read only memory (CD-ROB), compact disk-read/write (CD-R/W) and DVD. In the context of this document, a computer readable storage medium may be any tangible medium that can contain, or store a program for use by or in connection with an instruction execution system, apparatus, or device.

Computer program code for carrying out operations for aspects of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A computer program product is provided. The computer program product includes a computer usable medium that in turn includes a computer readable program. The computer readable program when executed on a computer causes the computer to: receive a request to update a x'th generation copy of a data entity; wherein x is a positive integer; apply an update function responsive to x such as to update a first sub-group of targets; receive a request to read a y'th generation copy of the data entity; and apply a retrieve function responsive to y such as to search for the y'th generation copy of the data entity at a second sub-group of targets; wherein the first and second sub-groups intersect once only and only if y is smaller than x.

The computer readable program when executed on a computer causes the computer to define the update function and the retrieve function such as to provide a requested relationship between values of a parameter associated with the applying of the update function and with the applying of the retrieve function.

The computer readable program when executed on a computer causes the computer to define a representation format of x and of y such as to determine a relationship between sizes of the first and second sub-groups.

The computer readable program when executed on a computer causes the computer to alter a value of a lowest non zero digit of x and wherein the applying of the retrieve function comprises altering a value of a lowest non zero digit of y.

The computer readable program when executed on a computer causes the computer to define a radix of x and a radix of y.

The computer readable program when executed on a computer causes the computer to define a first radix to a digit of x and define another radix to another digit of x.

The computer readable program when executed on a computer causes the computer to repetitively find a next target of the second sub-group of targets by zeroing a lowest non-zero digit of an index of a current target and incrementing a digit that follows the zeroed digit.

The computer readable program when executed on a computer causes the computer to calculate a next target of the first sub-group of targets by subtracting one from a lowest non zero digit of an index of a current member of the first sub-group of copies.

The computer readable program when executed on a computer causes the computer to search for a target that locally stores a copy of the data entity.

The computer readable program when executed on a computer causes the computer to determine whether an x'th target locally stores another copy of the data entity.

The computer readable program when executed on a computer causes the computer to update at least target by applying the update function in response to a value that is smaller than x and destage the x'th generation copy of data entity to the x'th target.

The computer readable program when executed on a computer causes the computer to update the at least one target by the other copy the data entity.

The computer readable program when executed on a computer causes the computer to locate the other copy of the data entity by applying the retrieve function.

The computer readable program when executed on a computer causes the computer to withdraw a target by updating lower index value targets.

The computer readable program when executed on a computer causes the computer to allow access to the withdrawn target while updating the lower index value targets by portions of the withdrawn copy.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method for managing a group of targets that store different copies of a data entity, the method comprising:
    receiving a request to update an x'th generation copy of a data entity, where x is a positive integer;
    applying an update function in response to the update request for defining a first sub-group of targets from the group of targets, where x is a representation of an index of the first sub-group of targets, wherein the update function is responsive to x to apply the update to the x'th generation copy of a data entity on the first sub-group of targets;
    receiving a request to read a y'th generation copy of the data entity, where y is a positive integer; and
    applying a retrieve function in response to the read request for searching for the y'th generation copy of the data entity in a second sub-group of targets, where y is a representation of an index of the second sub-group of targets, and wherein the retrieve function is responsive to y to select the second sub-group of targets from the group of targets.

2. The method of claim 1 further comprising:
    defining the update function and the retrieve function for providing a requested relationship between values of a parameter associated with the applying of the update function and with the applying of the retrieve function.

3. The method of claim 2 further comprising:
defining a representation format of x and of y for determining a relationship between sizes of the first and second sub-groups.

4. The method of claim 1 further comprising:
applying the update function including altering a value of a lowest non zero digit of x and applying the retrieve function including altering a value of a lowest non zero digit of y.

5. The method of claim 4 further comprising:
defining a first radix to a digit of x and defining another radix to another digit of x, wherein the radices are changed during the applying of the update function.

6. The method of claim 4 further comprising:
applying the update function including calculating a next target of the first subgroup of targets by subtracting one from a lowest non zero digit of an index of a current member of the first sub-group of targets.

7. The method of claim 1 further comprising:
applying the retrieve function repetitively for finding a next target of the second sub-group of targets by zeroing a lowest non-zero digit of an index of a current target and incrementing a digit that follows the zeroed digit.

8. A computer program product for managing a group of targets that store different copies of a data entity, the computer program product comprising:
a computer readable storage medium having computer readable program code embodied therewith, the computer readable program code comprising:
computer readable program code configured to receive a request to update an x'th generation copy of a data entity where x is a positive integer;
computer readable program code configured to apply an update function in response to the received update request for defining a first sub-group of targets from the group of targets, where x is a representation of an index of the first sub-group of targets, wherein the update function is responsive to x to apply the update to the x'th generation copy of a data entity on the first sub-group of targets;
computer readable program code configured to receive a request to read a y'th generation copy of the data entity, where y is a positive integer; and
computer readable program code configured to apply a retrieve function in response to the received read request for searching for the y'th generation copy of the data entity in a second sub-group of targets, where y is a representation of an index of the second sub-group of targets, and wherein the retrieve function is responsive to y to select the second sub-group of targets from the group of targets.

9. The computer program product of claim 8 further comprising:
computer readable program code configured to define the update function and the retrieve function for providing a requested relationship between values of a parameter associated with an appliance of the update function and with an appliance of the retrieve function.

10. The computer program product of claim 9 further comprising:
computer readable program code configured to define a representation format of x and of y for determining a relationship between sizes of the first and second sub-groups.

11. The computer program product of claim 10 further comprising:
computer readable program code configured to alter a value of a lowest non zero digit of x and apply the retrieve function by altering a value of a lowest non zero digit of y.

12. The computer program product of claim 11 further comprising:
computer readable program code configured to define a first radix to a digit of x and to define another radix to another digit of x.

13. The computer program product of claim 12 further comprising:
computer readable program code configured to repetitively find a next target of the second sub-group of targets by zeroing a lowest non-zero digit of an index of a current target and incrementing a digit that follows the zeroed digit.

14. The computer program product of claim 13 further comprising:
computer readable program code configured to calculate a next target of the first sub-group of targets by subtracting one from a lowest non zero digit of an index of a current member of the first sub-group of copies.

15. The computer program product of claim 14 further comprising:
computer readable program code configured to search for a target that locally stores a copy of the data entity.

16. The computer program product of claim 15 further comprising:
computer readable program code configured to determine if an x'th target locally stores another copy of the data entity.

17. The computer program product of claim 16 further comprising:
computer readable program code configured to update at least one target by applying the update function in response to a value that is smaller than x and destage the x'th generation copy of data entity to the x'th target.

18. A method for providing a service to a customer over a network, the method comprising:
receiving a request over the network to update an x'th generation copy of a data entity, where x is a positive integer;
applying an update function in response to the update request for defining a first sub-group of targets from the group of targets, where x is a representation of an index of the first sub-group of targets, wherein the update function is responsive to x to apply the update to the x'th generation copy of a data entity on the first sub-group of targets;
receiving a request to read a y'th generation copy of the data entity, where y is a positive integer;
applying a retrieve function in response to the read request for searching for the y'th generation copy of the data entity in a second sub-group of targets, the first and second sub-groups intersecting only once if y is less than x, where y is a representation of an index of the second sub-group of targets, and wherein the retrieve function is responsive to v to select the second sub-group of targets from the group of targets; and
sending a response over the network representative of at least one characteristic of the y'th generation copy of the data entity.

19. The method of claim 18 further comprising:
applying the retrieve function repetitively for finding a next target of the second sub-group of targets by zeroing a lowest non-zero digit of an index of a current target and incrementing a digit that follows the zeroed digit.

20. The method of claim 19 further comprising:
applying the update function for calculating a next target of the first sub-group of targets by subtracting one from a lowest non zero digit of an index of a current member of the first sub-group of copies.

* * * * *